United States Patent [19]
Kashio

[11] 4,045,780
[45] Aug. 30, 1977

[54] APPARATUS FOR ARITHMETICALLY PROCESSING BILL RECORDS

[75] Inventor: Toshio Kashio, Tokyo, Japan

[73] Assignee: Casio Computer Co., Ltd., Tokyo, Japan

[21] Appl. No.: 598,801

[22] Filed: July 24, 1975

Related U.S. Application Data

[63] Continuation-in-part of Ser. No. 465,725, April 30, 1974, abandoned, which is a continuation of Ser. No. 371,472, June 19, 1973, abandoned.

[51] Int. Cl.² .............................................. B41J 25/18
[52] U.S. Cl. .................................... 364/900; 197/176
[58] Field of Search ................... 340/172.5; 235/60.12, 235/159; 197/20, 176

[56] References Cited
U.S. PATENT DOCUMENTS 3,885,663  5/1975  Suzuki .................................. 197/176

*Primary Examiner*—Gareth D. Shaw
*Assistant Examiner*—C. T. Bartz

[57] ABSTRACT

An apparatus for arithmetically processing bill records wherein the printing device is provided with a first memory register having a digit-storing capacity corresponding to a maximum impression length specifically designed for said printing device and a tabset register which has the same digit-storing capacity as the first memory register and in which shifting is carried out in synchronization with that taking place in the first memory register. Tabset positions in the tabset register are determined by key operation so as to cause the digit-storing capacity of the first memory register in which shifting is carried out in synchronization with that occurring in the tabset register to be divided into desired sections corresponding to the widths of a plurality of columns appearing on different forms of bills, thereby enabling numerical values given in multiform bills to be recorded and to be arithmetically processed with ease and said printing device is further provided with a second memory register which has the same digit-storing capacity as the first memory register, in which shifting is carried out in synchronization with that taking place in said first memory register, and which is connected thereto through an adder so as to store vertical totals arrived at by adding up numerical values already stored in the first memory register belonging to the respective columns one line after another of impression on the bill.

7 Claims, 15 Drawing Figures

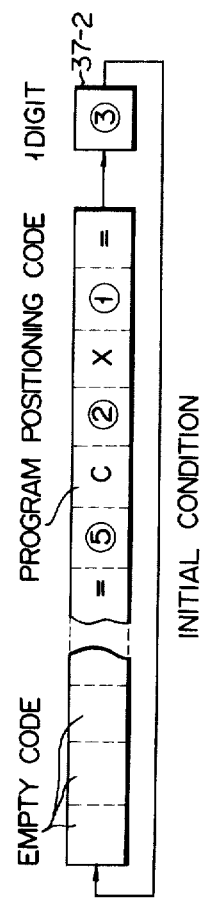
FIG. 6
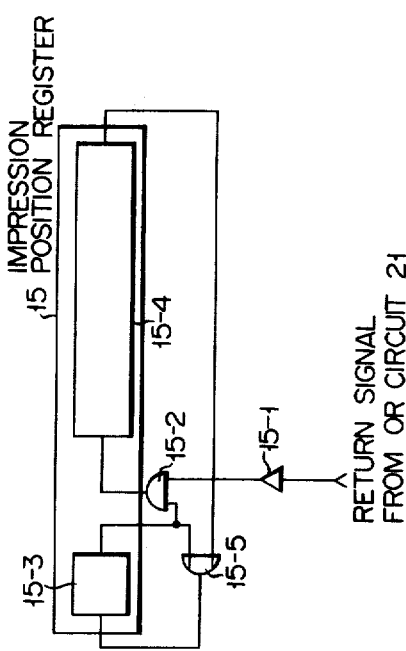
FIG. 2
FIG. 11A
FIG. 11B
FIG. 11C

FIG. 8
| TABSET 15 ▽ | ① | ② | ③ | ④ | ⑤ | ⑥ | ⑦ | ⑧ |
|---|---|---|---|---|---|---|---|---|
| | | 30 40 ▽ | 55 ▽ | 65 ▽ | 80 ▽ | 90 ▽ | 105 ▽ | 120 ▽ |
| | | | STORE A | | STORE B | | STORE C | ARTICLE TOTAL AMOUNT |
| ITEM | UNIT COST | QUANTITY | AMOUNT | QUANTITY | AMOUNT | QUANTITY | AMOUNT | |
| AS-8E | 29,800 | 15 | 447,000 | 25 | 745,000 | 35 | 1,043,000 | 2,235,000 |
| 202-A | 72,000 | 8 | 576,000 | 12 | 864,000 | 18 | 1,296,000 | 2,736,000 |
| R-1 | 157,000 | 3 | 471,000 | 8 | 1,256,000 | 15 | 2,355,000 | 4,082,000 |
| TOTAL | 258,800 | 26 | 1,494,000 | 45 | 2,865,000 | 68 | 4,694,000 | 9,053,000 |
(GRAND TOTAL)
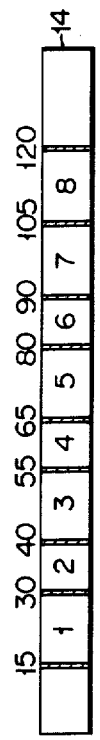
FIG. 9A
FIG. 9B
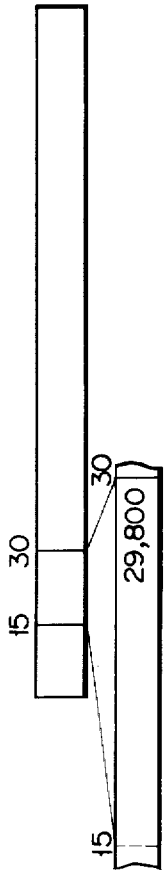
FIG. 10

APPARATUS FOR ARITHMETICALLY PROCESSING BILL RECORDS

CROSS-REFERENCE TO THE RELATED APPLICATIONS

This application is a continuation-in-part application of Ser. No. 465,725, filed Apr. 30, 1974 now abandoned which in turn was a continuation application of Ser. No. 371,472, filed June 19, 1973, now abandoned.

BACKGROUND OF THE INVENTION

This invention relates to an apparatus for arithmetically processing bill records, wherein, upon key operation, the digit-storing capacity of a memory register corresponding to a maximum length of impression specified for a printing device attached to the apparatus is divided into sections representing the widths of columns varying with the forms of bills whose numerical records are going to be processed, thereby enabling numerical values shown in multiform bills to be recorded and to be arithmetically processed with ease.

Processing, totaling and recording of numerical data shown in bills are widely practised by a computer or calculator coupled with a printing device. Where numerical values are totaled and recorded, it has customarily been undertaken previously to define tabset positions in a printing device for each form of bills varying with the kinds thereof, and control the operation of the printing device according to the tabset positions already determined, or to designate said tabset positions by perforating a tape at desired points, and, if necessary, exchange such perforated tapes according to the forms of bills whose numerical values are to be processed. In this case, there has hitherto been used a memory device having a sufficient capacity to store a maximum number of digits indicated in the respective columns whose widths are determined by the tabset positions or a maximum number of digits constituting numerical data resulting from arithmetical totaling. However, it is impossible properly to define the capacity of said memory register in advance, because the number of columns into which one line of impression should be divided is undeterminable due to the different forms of bills being processed, as well as due to the different number of digits included in the respective columns. To attain the calculation of numerical values indicated in bills of every possible form, therefore, the memory register is not only demanded to have a capacity large enough to store a maximum number of digits being indicated in a given column, even when a numerical value consisting of only a few digits is actually recorded therein, but also as a whole should have an overall capacity as is sufficient to store a maximum number of digits arrived at by multiplying a largest possible number of digits among those shown in the respective columns by a largest possible number of columns appearing on bills, no matter how their forms vary. The above-mentioned requirements have been accompanied with the drawbacks of unnecessarily increasing the capacity of the memory register and unavoidably providing a complicated program for arithmetic operation. Also when numerical values belonging to the respective columns of a bill are added up one line after another to provide a vertical total, then a memory register required for such total must have a sufficient capacity to store a sum total consisting of a largest possible number of digits among those consisting the vertical totals of numerical values shown in the lines included in the respective columns.

SUMMARY OF THE INVENTION

One object of this invention is to provide an apparatus for arithmetically processing bill records free from the above-mentioned disadvantages occurring in the past, wherein a memory register (for example, the type set forth in MDS/LSI Standard Products Catalog issued by Texas Instruments Company, July, 1971, p.38 to 46) having a digit-storing capacity corresponding to a maximum impression length specified for a printing device attached to the apparatus has said capacity divided into desired sections corresponding to the widths of columns appearing on a bill of any form, and said printing device records the numerical values to each column and the results of horizontally totaling those of the numerical values belonging to the respective columns which are arranged on the same line of impression.

Another object of the invention is to provide an apparatus for arithmetically processing bill records comprising another memory register which has the same digit-storing capacity as the first mentioned memory register whose capacity can be freely divided into sections corresponding to the widths of columns appearing on bills of any form, in which shifting is carried out in synchronization with that taking place in said first memory register, and which is also connected thereto through an adder so as to store totals arrived at by adding up numerical values belonging to the respective columns one line after another in those divided sections of the capacity of said another memory register which represent the widths of columns defined by tabset positions.

To attain the above-mentioned objects of this invention, there is provided an apparatus for arithmetically processing bill records comprising a first memory register having a digit-storing capacity corresponding to a maximum length of impression carried out by a printing device attached to the apparatus and capable of storing in series a plurality of numerical values supplied from an input device and a plurality of numerical values denoting the results of arithmetic operation (horizontal counting) derived from an arithmetic operation device, a tabset register which has the same digit-storing capacity as said first memory register, in which shifting is carried out in synchronization with that taking place in said first memory register, and in which, upon receipt of a tabset position-designating signal from the input device, tabsetting is carried out to divide the digit-storing capacity of said tabset register into sections corresponding to the widths of columns specified for a given form of bill, thereby also dividing the digit-storing capacity of said first memory register in which shifting is carried out in synchronization with that taking place in the tabset register into sections corresponding to the widths of columns determined by said tabsetting so as to match the form of the bill, and a second memory register which has the same digit-storing capacity as the first memory register, in which shifting is carried out in synchronization with that occurring in the first memory register, and which is also connected thereto through an adder so as to store totals arrived at by adding up numerical values belonging to the respective columns one line after another in the corresponding ones of the divided sections of the capacity of said second memory register which represent the widths of the respective columns defined by the aforesaid tabsetting.

If a bill has such a number of columns that a total number of digits indicated in all the columns can be arithmetically processed within the range of a maximum length of impression carried out by a printing device attached to a bill record-processing apparatus arranged as described above, then this invention enables the digit-storing capacity of a memory register received in said apparatus to be divided into sections corresponding to a plurality of desired column widths by tabsetting, regardless of the number of columns into which one line of impression on the bill is divided or the number of digits indicated in any column.

Where, therefore, a memory register received in the subject apparatus has a sufficient capacity to store a less number of digits admitting of any type of arithmetic operation corresponding to the form of a bill being processed, namely, such a number of digits falling within the range of a maximum length of impression undertaken by a printing device attached to said apparatus, then the object of processing bill records can be fully attained without difficulties, thus maing it unnecessary to provide a complicated program for arithmetic operation.

Further, depending on the form of a bill, it is often required to provide vertical totals of numerical values belonging to the respective columns by carrying out addition or subtraction of said numerical values one line after another. In this case, the vertical totals are stored in the corresponding ones of the divided sections of the capacity of the second memory register required for vertical totaling which represent a plurality of column widths equal to those into which the capacity of the first memory register is divided. To store the vertical totals, therefore, the second memory register is only required to have a sufficient capacity to store such a number of digits as falls within the range of a maximum length of impression made by the printing device.

BRIEF DESCRIPTION OF THE DRAWING

FIG. 2 is a concrete circuit arrangement for operating an impression position register included in FIG. 1A;

FIG. 6 shows the manner in which a program is stored in the program register included in FIG. 5;

FIG. 8 illustrates numerical values on a bill as recorded according to the embodiment of FIGS. 1A and 1B;

FIGS. 9A and 9B present the manner in which numerical values are stored in a tabset register and impression position register;

FIG. 10 indicates the manner in which numerical values are stored in the memory register; and FIGS. 11A to 11C are illustrations intended to indicate the manner in which numerical data are stored in the first and second memory registers when vertical totaling is made of numerical values belonging to the respective columns by adding up said values one line after another.

DETAILED DESCRIPTION OF THE PREFERRED EMBODIMENTS

There will now be described by reference to the appended drawings an apparatus according to this invention for arithmetically processing numerical values given in bills of any form.

Figure 1A:
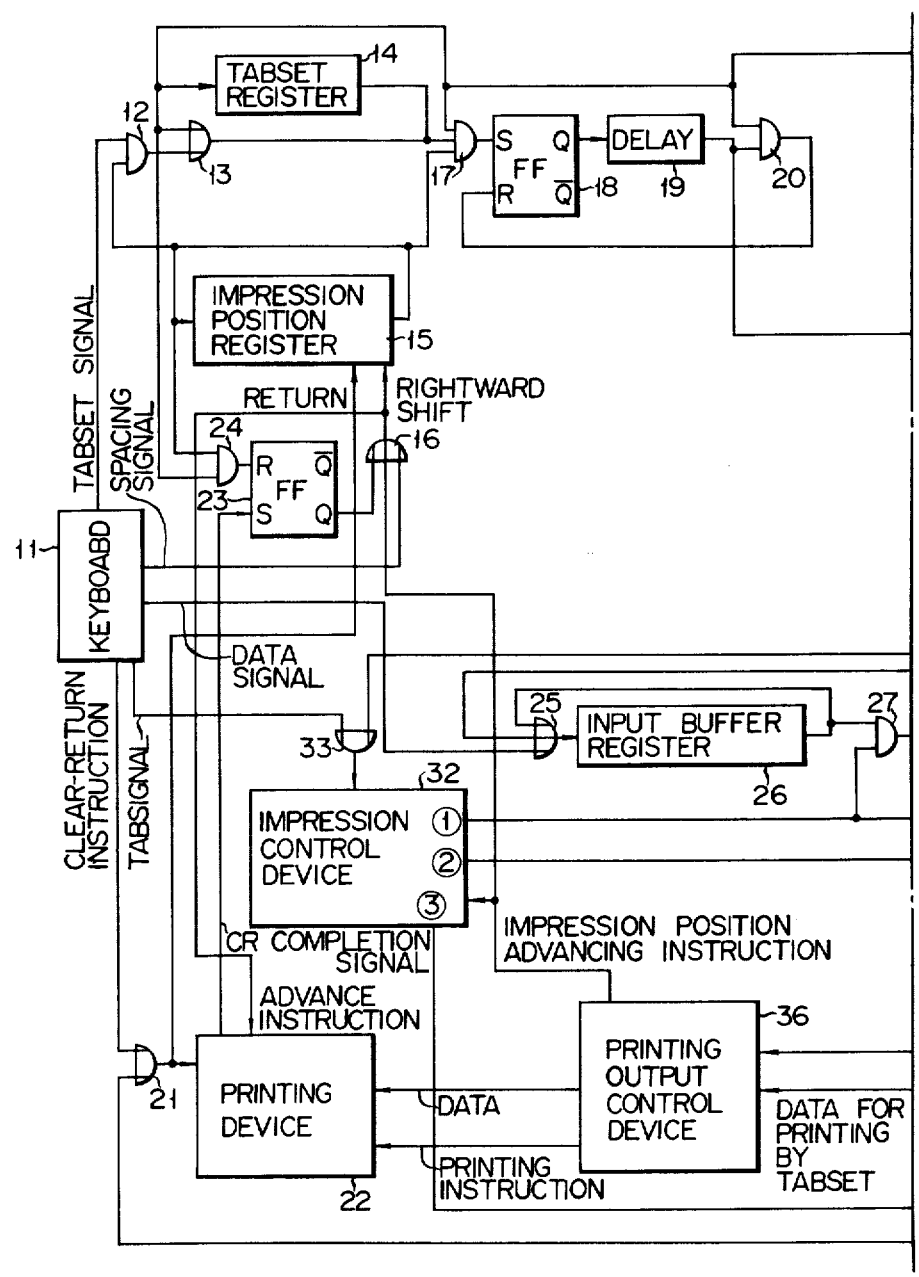
FIGS. 1A and 1B jointly constitute a block circuit diagram of a bill-record processing apparatus according to this invention.
Figure 1B:
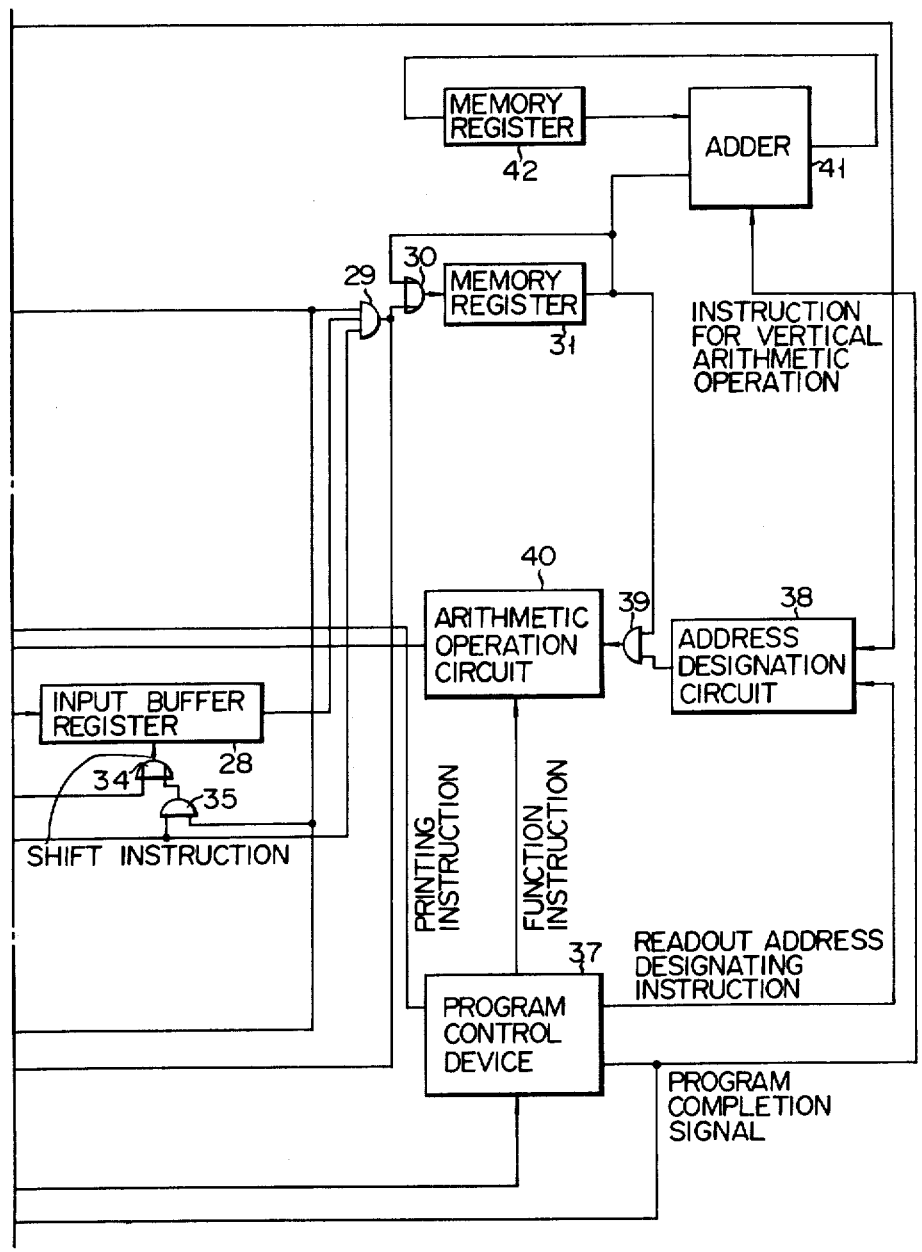

Referring to FIGS. 1A and 1B, referential numeral 14 denotes a series type tabset register formed of, for example, a shift register and designed to define tabset positions conforming to the form of a bill whose records are to be arithmetically processed. Tabsetting in the tabset register 14 is effected by supplying tabset-instructing signals from keys (not shown) on a keyboard 11 (hereinafter referred to "tabset keys") through an AND circuit 12 and OR circuit 13 so as to transmit and shift information on the printing head position stored in an impression position register 15 to said tabset register 14. Shifting of data in the tabset register 14 circulates through the OR circuit 13. The tabset register 14 has a sufficient capacity to store such a number of bits as corresponds to a largest possible number of digits impressed by the printing head of the printing device to fill up one line of impression on a bill. The impression position register 15 is formed of, for example, a series type shift register and has the same digit-storing capacity as the tabset register 14. In the impression position register 15, stored data is shifted to the right, each time a space signal is supplied to said register 15 through an OR circuit 16 by key operation on the keyboard 11. Said rightward shifting circulates through an external circuit. The space signal is generated, each time a key on the keyboard 11 is depressed. An output signal from the impression position register 15 is transmitted to one input gate of the AND circuit 12 and also to one of the three input gates of an AND circuit 17. The other input gates of this AND circuit 17 are supplied with an input signal to the tabset register 14 and an output signal therefrom respectively. An output signal from the OR circuit 16 for starting the shifting of stored data in the impression position register 15 is also delivered as an advance-instructing signal to a printing device 22 including a printing head (refer to the United States Patent Application Ser. Nol 11,186 now U.S. Pat. No. 3,635,219 filed by the present applicant on Feb. 16, 1970). Therefore, shifting of stored data in the impression position register 15 can be effected by supplying a space signal as an operator is seeing the advancing condition of the printing head of the printing device 22. Thus, the impression position register 15 is stored with information on the position to which the printing head has been moved. The impression position register 15 and tabset register 14 having the same digit-storing capacity and the same number of bits admit of synchronous cyclic shifting of stored data. Where a bill has such a form as requires the first tabset position to be fixed at the 15th digit position counted from the extreme left end of the tabset register 14, then a space signal is successively generated by operation of a space key on the keyboard 11 to effect the rightward shifting of data stored in the impression position register 15 in conformity to the advance of the printing head. Where the printing head has advanced to a prescribed point on the bill, namely, the first tabset position, (now let it be assumed that information on the position of the printing head is stored in the 15th digit position, namely, the 15th bit position of the impression position register 15), is written in the 15th digit position, namely, the 15th bit position of the tabset register 14 as a signal denoting a tab bit being set through the AND circuit 12 and OR circuit 13, thereby defining the first tabset position of the tabset register 14. Subsequent repetition of the generation of a space signal and also a tabset instructing signal with attention paid to the advanced position of the printing head enables any desired tabset position to be written in the tabset register 14, ready for impression of the numerical data and the results of arithmetically processing the numerical values indicated in the columns of a bill.

Where the printing head is returned to the extreme left end of the printing device 22 prior to commencement of its use, a clear return signal (hereinafter referred to as a "CR signal") is supplied from a return key (not shown) on the keyboard 11 to the printing head of the printing device 22 through an OR circuit 21 to effect said return. In this case, the CR signal is also delivered to the impression position register 15 so as to cause position information on the printing head previously stored in a given bit position of the impression position register 15 to be brought back to the extreme left bit position thereof. Return of the printing head for line change required upon completion of impression on the respective lines of a bill is carried out by supplying the printing device with a program completion signal generated by the later described program control device 37 as a CR signal through the OR circuit 21. The CR signal which has passed through said circuit 21 causes information on the previous position of the printing head in accordance with a givenbit position of the impression position register 15 to be shifted back to the extreme left bit position thereof. When shifting is stopped at this point, the printing head is brought back to the extreme left end of the printing device 22, which in turn delivers a clear return completion signal to the set terminal of a flip-flop circuit 23. An output signal from the Q terminal of said flip-flop circuit 23 is supplied as a rightward shift instructing sigal to the impression position register 15 through the OR circuit 16. Upon receipt of said rightward shift instructing signal, position information on the printing head stored in the extreme left bit position of the impression position register 15 is shifted rightward to the first tabset position already set in the tabset register 14 according to the form of a bill being processed. When detecting the arrival of the aforesaid information at the first tabset position, an AND circuit 24 gives forth an output signal which resets the flip-flop circuit 23 to prevent the OR circuit 16 from generating an output signal, thereby causing the printing device to set for starting impression with the first tabset position of the bill.

As mentioned above, the CR signal causes information on the position of the printing head in accordance with a given bit position of the impression position register 15 to be shifted back to the extreme left bit position thereof and held there. This impression position register 15 functions as described below. As illustrated in FIG. 2, the impression position register 15 consists of a one-digit register unit 15-3 and shift register unit 15-4. Normal shifting of stored data circultes through said shift register unit 15-4, OR circuit 15-5, said one-digit register unit 15-3 -3(having a one-bit capacity in this case) and an AND circuit 15-2 in turn. One of the two gate terminals of the AND circuit 15-2 is connected to an inverter 15-1 in the manner indicated in FIG. 2. When the inverter 15-1 receives a return signal from the OR circuit 21 of FIG. 1A, the AND circuit 15-2 ceases to produce an output signal, thereby preventing the shifting of a stored signal from the one-digit register unit 15-3 to the shift register unit 15-4. Where, under this condition, shifting takes place again in the shift register unit 15-4, the signal denoting the position of the printing head which is stored in said shift register unit 15-4 is shifted to the one-digit register unit 15-3 through the OR circuit 15-5. Said printing head position signal is held by being allowed to circulate through a closed circuit constituted by the one-digit register unit 15-3 and OR circuit 15-5, showing that the position of the printing head still remains at the extreme left bit position of the impression position register 15, namely, at the extreme left end of the printing device 22.

A tabset-designating signal supplied by operation of a tabset key on the keyboard 11 causes a tabset position corresponding to the form of a bill being processed to be stored in the proper bit position of the tabset register 14. Where coincidence is established between the first tabset position and the shifted position of a stored bit denoting the position of the printing head which is stored in the impression position register 15, then the resultant coincidence output from the impression position register 15 is detected by the AND circuit 17. Said coincidence output is transmitted from the AND circuit 17 to the set terminal of the flip-flop circuit 18. An output signal from the Q terminal of the flip-flop circuit 18 is delivered to one of the gate terminals of an AND circuit 29 after being delayed one bit in a delay circuit 19. An output from the delay circuit 19 is conducted to one of the gate terminals of an AND circuit 20, the other of which is supplied with an output from the tabset register 14. After, therefore, an output from the delay circuit 19 is transmitted to the AND circuit 29, a signal denoting the succeeding tabset position stored in the tabset register 14 is detected by the AND circuit 20. This AND circuit 20 continues to send forth an output to said other gate of the AND circuit 29 until the flip-flop circuit 18 is reset, namely, for a period required for impression to be made ina column whose width is defined between the first tabset position at the 15th digit position and the succeeding tabset position at the 30th digit position (refer to FIG. 9A). Where, under this condition, said other gate of the AND circuit 29 is supplied with fresh information being recorded in said succeeding column, then said information is stored in a first memory register 31 through an OR circuit 30 upon receipt of an output from the AND circuit 29. At this time, information being recorded in said succeeding column by key operation on the keyboard 11 is stored in a first input buffer register 26 through an OR circuit 25. This first input buffer register 26 has the same digit-storing capacity as the tabset register 14. Namely, the digits included in said capacity are each formed of four bits. In the first input buffer register 26, stored data is repeatedly shifted in synchronization with data stored in the tabset register 14. An output from said first input buffer register 26 passes through an AND circuit 27 to a second input buffer register 28, an output from which is conducted to one of the gate terminals of the AND circuit 29.

Immediately after information being recorded in a given column of a bill is supplied by operation of the keyboard 11, a tabset key thereon is depressed to generate a tabset instructing signal, which is delivered to an impression control device 32 through an OR circuit 33. An output marked 1 from said impression control device 32 is transmitted to the other gate terminal of the AND gate 27 and one of the two gate terminals of an OR circuit 34, so as to shift information stored in the first input buffer register 26 to the second input buffer register 28. The succeeding output marked 2 from the impression control device 32 is sent to one of the two gate terminals of an AND circuit 35. At this time, the delay circuit 19 issues an output delayed one bit from the first tabset position required to define the width of the succeeding column. When supplied with said delayed output, the AND circuit 35 gives forth an output signal, which is supplied as a readout shift instructing signal to the second input buffer register 28 through the OR circuit 34. When all the gates of the AND circuit 29 are opened by said readout shift instructing signal, information stored in the second input buffer register 28 is shifted to the first memory register 31 through the OR circuit 30. The first memory register 31 has the same digit storing capacity as the tabset register 14. The digits included in said capacity are each formed of four bits. Information stored in the first memory register 31 is shifted in synchronization with that stored in the tabset register 14. Namely, one cycle of shifting in the first memory register 31 takes the same length of time as that in the tabset register 14. This means that four bits are shifted in the first memory register 31 during the same period as that in which one bit is shifted in the tabset register 14. Accordingly, the capacity of the first memory register 31 is divided into sections corresponding to the widths of columns resulting from tabsetting by the tabset register 14 and has pieces of information being recorded in the respective columns of a bill stored in the addresses representing said divided sections.

Figure 3:
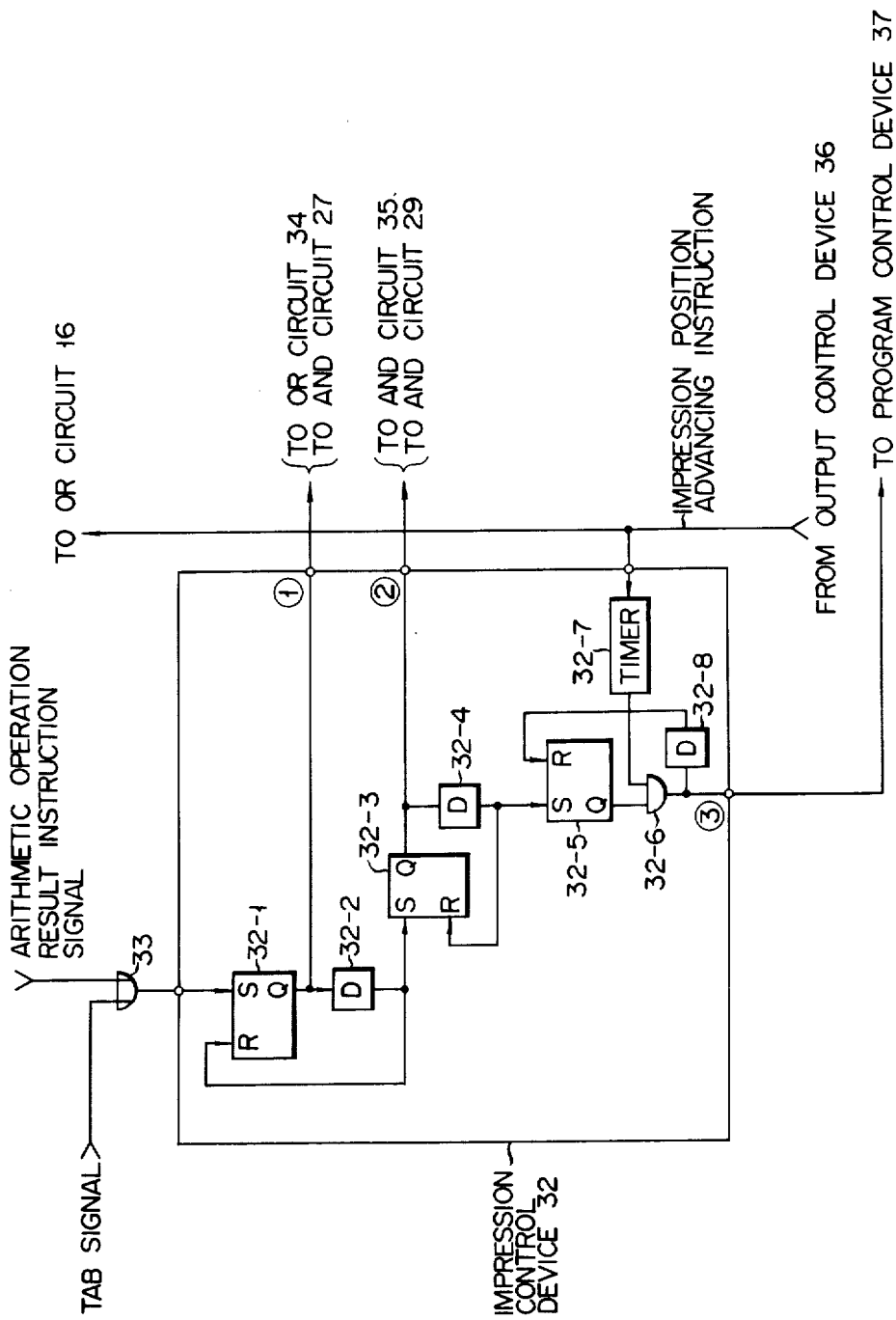
FIG. 3 is a concrete circuit arrangement of an impression control device included in FIG. 1A.

When supplied with a tabset instructing signal, the impression control device 32 gives forth outputs marked 1 and 2 as shown in detail in FIG. 3. When a tabset instructing signal is delivered through the OR circuit 33 to the set terminal of an S-R flip-flop circuit 32-1 included in said impression control device 32, then the output 1 from the Q terminal of said S-R flip-flop circuit 32-1 is transmitted to the AND circuit 27 and OR circuit 34 of FIGS. 1A and 1B. The period in which said output 1 continues to be given forth corresponds to one cycle of shifting by which information stored in the first buffer register 26 is fully shifted to the second input buffer register 28. The continuance of said output 1 is controlled by delaying its issue from the Q terminal of the S-R flip-flop circuit 32-1 in the delay circuit 32-2 and supplying a delayed output to the reset terminal of said flip-flop circuit 32-1. The output 2 from the impression control device 32 is produced when an output from the delay circuit 32-2 is carried to the S terminal of an S-R flip-flop circuit 32-3. The output 2 is delayed in a delay circuit 32-4 for a length of time corresponding to one cycle of shifting taking place in the second input buffer register 28. A delayed output from the delay circuit 32-4 resets the S-R flip-flop circuit 32-3, thereby terminating shifting of stored information from the input buffer register 28 to the first memory register 31. Upon completion of said shifting, namely, when the delay circuit 32-4 gives forth an output, a flip-flop-circuit 32-5 is set by said output. An output from the Q terminal of said flip-flop circuit 32-5 is supplied to one of the two gate terminals of an AND circuit 32-6. The other gate of the AND circuit 32-6 is supplied through a timer 32-7 with a signal instructing the advance of an impression position delivered from the later described printing output control device 36. A length of time at which the timer 32-7 is set is made longer than a period for which there is continuously issued an output signal from a one-shot circuit included in the printing output control device 36, namely, a period for which an impression position advancing instruction continues to be delivered to the impression position register 15. Therefore, said timer 32-7 does not produce any output, while an output from the one-shot circuit, namely, an impression position advancing instruction continues to be given forth. Where, however, upon completion of impression in a particular column in a bill, an impression position advancing instruction from the printing output control device 36 ceases to be generated, then the timer 32-7 issues an output signal to one of the gate terminals of the AND circuit 32-6, which in turn sends forth an output marked 3 to a program control device 37. Said output 3 from the AND circuit 32-6 resets the flip-flop circuit 32-5 after being delayed in a one-bit delay circuit 32-8, thereby causing the program control device 37 to perform an operation at the address of a memory register corresponding to a given column in a bill. The issue of said output 3 as a control instruction from the impression control device 32 to the program control device 37 is controlled by an impression position advancing instruction delivered from the printing output control device 36.

Figure 4:
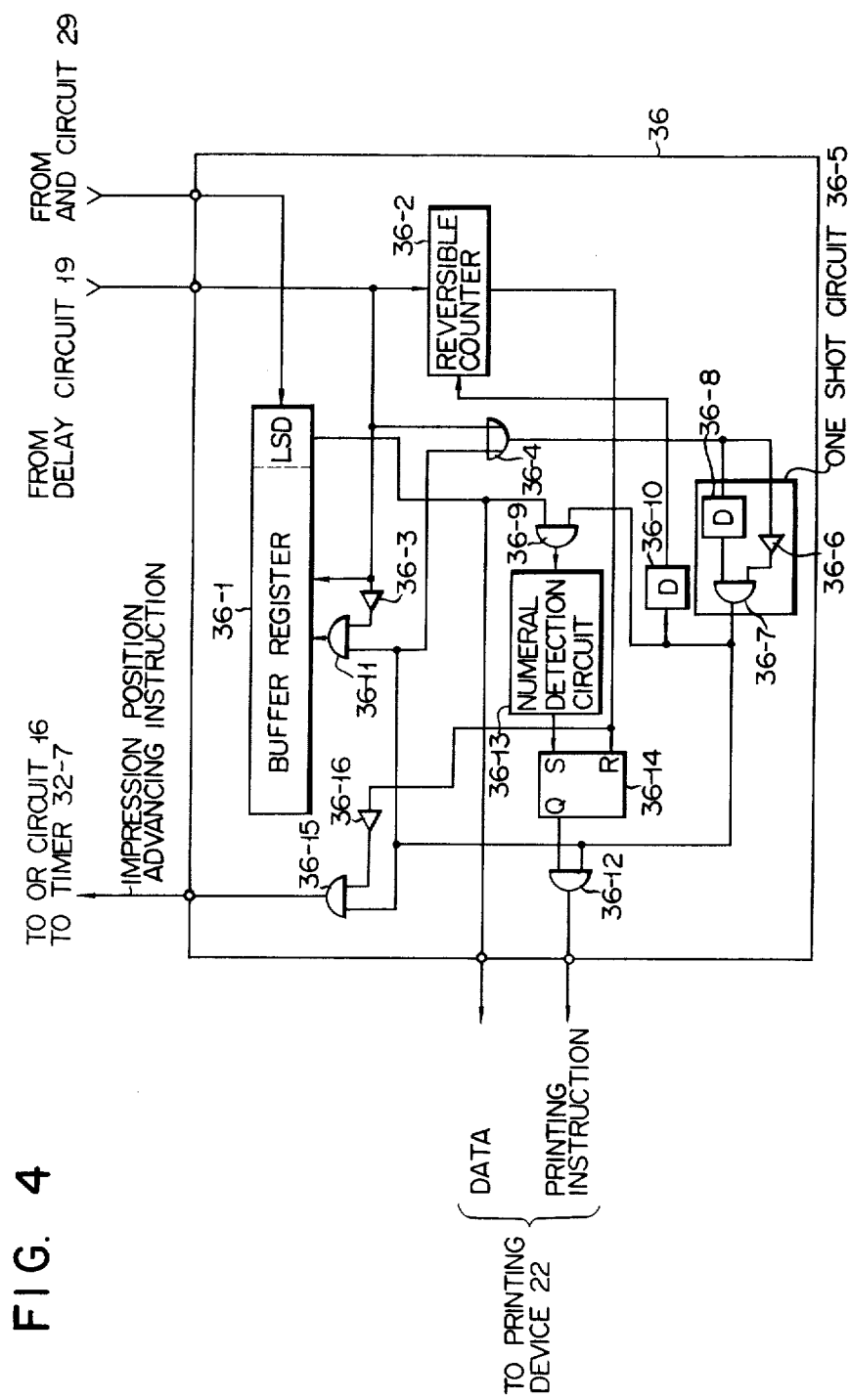
FIG. 4 is a concrete circuit arrangement of a printing output control device included in FIG. 1A.

There will now be described by reference to FIG. 4 the manner in which the operation of the printing output control device 36 is controlled by a tabset instruction from the delay circuit 19 shown in FIGS. 1A and 1B and an output signal from the AND circuit 29 shown therein. The printing output control device 36 includes a static buffer register 36-1 which has the same digit-storing capacity as the input buffer register 28 and memory register 31 both shown in FIG. 1B. An output from the delay circuit 19 of FIG. 1A acts as a signal for instructing the shifting of information stored in the input buffer register 28 and also the leftward shifting of information stored in the static buffer register 36-1. Thus, information supplied from the input buffer register 28 through the AND circuit 29 is temporarily stored in the static buffer register 36-1 by being shifted leftward therein. The frequency at which shifting repeatedly takes place in the static buffer register 36-1 upon receipt of a shift instruction is detected by supplying said instruction to a reversible counter 36-2 to cause it progressively to advance counting increments of +1. A shift instruction supplied from the delay circuit 19 to the static buffer register 36-1 is also transmitted to a one-shot circuit 36-5 through an OR circuit 36-4. This one-shot circuit 36-5 comprises an AND circuit 36-7, inverter 36-6 connected to one of the gates of said AND circuit 36-7 and a delay circuit 36-8 connected to the other gate thereof which carries out a delay of, for example, 30 milliseconds corresponding to a one digit-printing time. While a leftward shift instruction continues to be given forth from the delay circuit 19, the inverter 36-6 and in consequence the one-shot circuit 36-5 do not produce an output. Where, however, an output from the AND circuit 20 of FIG. 1A resets the flip-flop circuit 18 and an output from the delay circuit 19 is stopped to define a one column width, then information being recorded in said column, namely, that previously stored in the input buffer register 28 is fully shifted to the static buffer register 36-1. As the result, the inverter 36-6 sends forth an output, which is delivered to one of the gates of the AND circuit 36-7. The other gate thereof is supplied with an output from the delay circuit 36-8 carrying out a delay corresponding to a one digit-printing time. As the result, said AND circuit 36-7 issues an output to the one-shot circuit 36-5. Since, in this case, the delay circuit 36-8 generates an output only for a length of time corresponding to that required for one digit to be impressed, the AND circuit 36-7 also issues an output only for said one-digit printing time. A plurality of items of information fully stored in the static buffer register 36-1 are delivered to the printing device 22 and a printing instruction is also supplied thereto. This operation for printing is carried out in the following manner. An output issued for a one digit-printing time from the AND circuit 36-7 included in the one-shot circuit 36-5 is conducted to one of the gates of an AND circuit 36-11. The other gate thereof is supplied with an output from the inverter 36-3 when the delay circuit 19 causes to give forth an output. As the result, said AND circuit 36-11 produces an output, which causes a rightward shift corresponding to a one digit space to be made in the static buffer register 36-1. An output from the AND circuit 36-7 is also transmitted again to the delay circuit 36-8 and the inverter 36-6 included in the one-shot circuit 36-5 through the OR circuit 36-4. As the result, the one-shot circuit 36-5 sends forth an output for a length of time required to impress the succeeding one digit. Said output is supplied to the static buffer register 36-1 as a rightward shift instruction. The above-mentioned process is repeated. The frequency at which the AND circuit 36-7 repeatedly produces for a one digit-printing time an output instructing a rightward shift in the buffer register 36-1 is detected by delivering an output from the one-shot circuit 36-5 to the reversible counter 36-2 through a one bit delay circuit 36-10 and subtracting counts already made by the reversible counter 36-2, namely making a count of -1 each time. Where subtraction proceeds up to zero, the reversible counter 36-2 generates an output denoting zero. An output from the one shot circuit 36-5 is conducted as a rightward shift instruction to the static buffer register 36-1 and also supplied through one of the gates of an AND circuit 36-15 and OR circuit 16 to the impression position register 15 of FIG. 1A which has the same digit-storing capacity as the static buffer register 36-1 and in which shifting is carried out in synchronization with that occurring in the static buffer register 36-1. The other gate of the AND circuit 36-15 is supplied with an input through an inverter 36-16, until the reversible counter 36-2 issues an output denoting zero. As the result, an output from the one-shot circuit 36-5 is conducted as a shift instruction to the impression position register 15 through the AND circuit 36-15 and OR circuit 16.

Where the static buffer register 36-1 is supplied with a shift instruction, causing information stored therein to be shifted rightward one digit after another, and, under this condition, a different numerical number from zero is shifted to the least significant digit position (hereinafter referred to as an "LSD position"), then said digit itself is sent to the printing device 22 as a proper numerical information. A signal denoting a digit at the LSD position is delivered to one of the gates of the AND circuit 36-9. This AND circuit 36-9 produces an output, each time the other gate thereof is supplied with an output from the one-shot circuit 36-5. A numeral-detecting circuit 36-13 detects the arrival of a different numerical number from zero and produces an output which sets a flip-flop circuit 36-14. An output from this flip-flop circuit 36-4 is sent forth as a printing instruction to the printing device 22, through one of the gates of an AND circuit 36-12, each time the other gate of the AND circuit 36-12 is supplied with an output from the one-shot circuit 36-5, thereby causing information previously shifted from the LSD position of the static buffer register 36-1 to be printed. A signal of zero generated by the reversible counter 36-2 upon completion of rightward shifting in the static buffer register 36-1 resets the flip-flop circuit 36-14, thereby preventing the AND circuit 36-12 from sending forth any further printing instruction to the printing device 22. Said output of zero from the reversible counter 36-2 also prevents the inverter 36-16 from producing an output and stops the supply of an impression position advancing signal to the impression position register 15. Thus, shifting in the impression position register 15 is brought to an end, each time information stored therein advances for a distance corresponding to the width of the column in which impression was finished. At this time, the printing device 22 stops the movement of the printing head.

When the printing output control device 36 ceases to generate an impression position advancing instruction, the impression control device 32 delivers the output 3, as previously described in connection with FIG. 3, to the program control device 37, which in turn designates another column following that in which impression has already been made.

Figure 5:
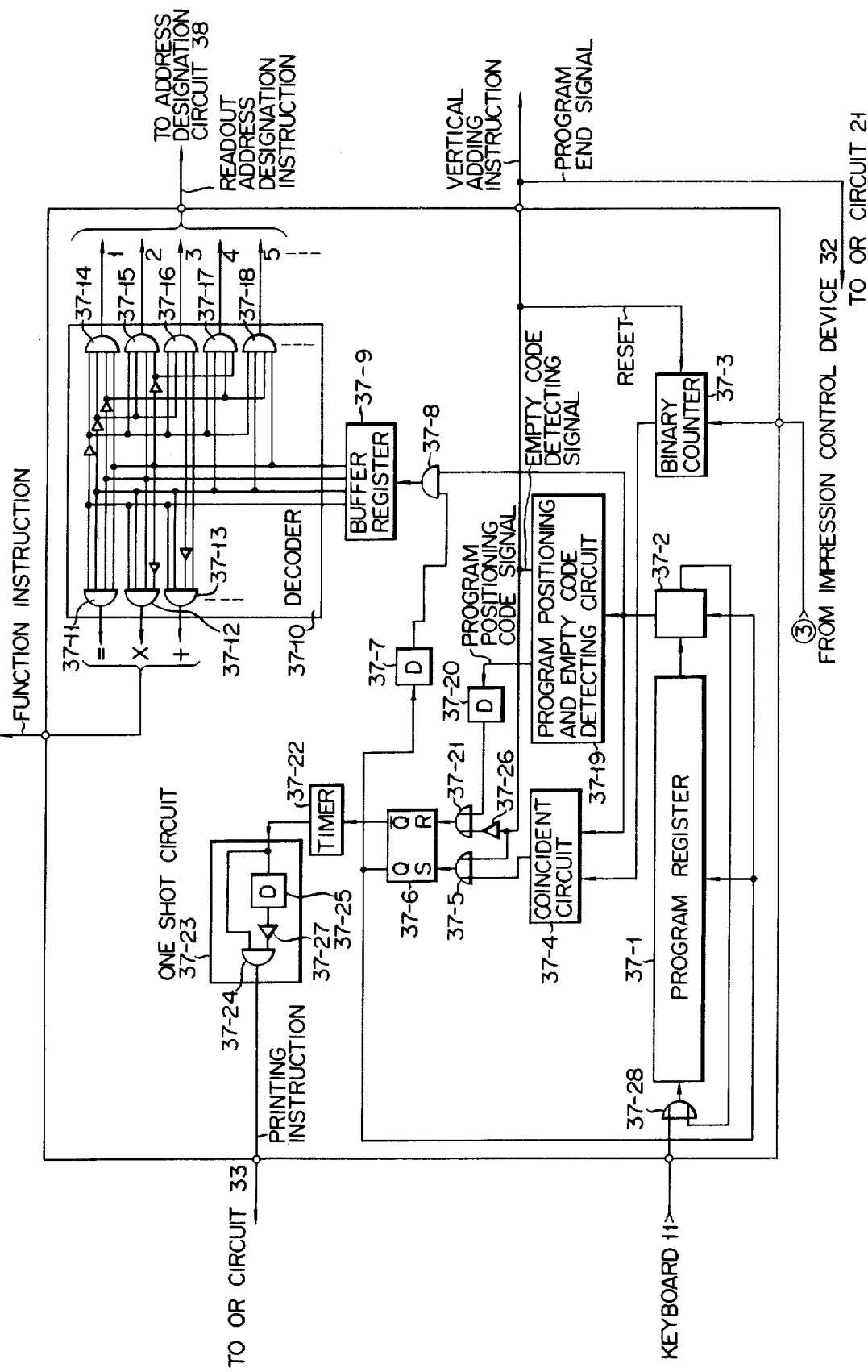
FIG. 5 is a concrete circuit arrangement of a program control device included in FIG. 1B.

There will now be described by reference to FIGS. 5 and 6 the details of said program control device 37. This program control device includes program registers 37-1, 37-2 (FIG. 5). These registers are previously stored by key operation with a program denoting a formula for arithmetically processing numerical values indicated in the respective columns of a bill. For example, where a given arithmetic operation program is the type in which a product arrived at by multiplying a numerical value in the first column 1 of a bill by a numerical value in the second column 2 thereof is to be recorded in the third column 3, and another program is the type in which a product arrived at by multiplying a numerical value in the first column 1 by a numerical value in the fourth column 4 is to be entered in the fifth column 5, then the programs denoting the above-mentioned formulas of arithmetic operation, thet is, $3 = 1 \times 2$ and $5 = 1 \times 4$ are stored in the serially arranged coded form in the corresponding addresses of the memory register as illustrated in FIG. 6 showing the initial conditions of said programs with a program positioning code C interposed between said programs.

The program control device 37 is provided with a binary counter 37-3 which repeatedly carries out counting in the binary form, each time the impression control device 32 issues the output 3. Now let it be assumed that the entry of numerical values in the first and second columns 1, 2 is completed and a product arrived at by multiplying a numerical value in the first column 1 by a numerical value in the second column 2 is recorded in the third column 3. Where, in this case, coincidence is established between a value counted by the binary counter 37-3 upon receipt of the output 3, each time entry in the columns 1, 2 is finished, and a code number denoting a third address corresponding to the third column 3, then said coincidence is detected by a coincidence circuit 37-4. This detection output is supplied as a set signal to the flip-flop circuit 37-6 through the OR circuit 37-5. An output produced at this time from the Q terminal of the flip-flop circuit 37-6 causes rightward shifting to take place in the program registers 37-1, 37-2. Said output from the Q terminal is supplied to one of the gates of an AND circuit 37-8 after being delayed in a one digit-delaying circuit 37-7. The other gate of the AND circuit 37-8 is supplied with the code "3" corresponding to the column 3 from the program register 37-2. Since, at this time, a coincidence output from the coincidence circuit 37-4 is delayed one digit time by the delay circuit 37-7, rightward shifting in the program registers 37-1, 37-2 proceeds by a one digit space, and consequently the code "=" shifted to the program register 37-2 is supplied to the other gate of the AND circuit 37-8. An output code denoting = from said AND circuit 37-8 is conducted to a decoder 37-10 after being temporarily stored in a buffer register 37-9. A decoded output from an AND circuit 37-11 included in said decoder 37-10 is sent forth as a function instruction to an arithmetic operation circuit 40. One digit time after the code = is supplied to the AND circuit 37-8, a code "1" corresponding to the first column 1 is also delivered to said AND circuit 37-8. A decoded output from an AND circuit 37-14 included in the decoder 37-10 is conducted as an address designating readout instruction to an address designation circuit 38 shown in FIG. 1B through the buffer register 37-9. Information already stored in the memory register 31 later to be entered in the first column 1 is delivered to an arithmetic operation circuit 40 through an AND circuit 39 shown in FIG. 1B. One more digit time afterward, a code of "×" is shifted to the program register 37-1 and thereafter decoded in the decoder 37-10, which in turn gives forth a function instruction represented by the × code to the arithmetic operation circuit 40 through the AND circuit 37-2 included in said decoder 37-10. Still another digit time afterward, a code "2" corresponding to the second column 2 is issued from an AND circuit 37-15 included in the decoder 37-10, to the address designation circuit 38, which in turn designates an address corresponding to the second column 2 and gives an instruction to read out said address. Information on a numerical value given in the second column 2 is supplied to the arithmetic operation circuit 40, so as to be multiplied by information on a numerical value shown in the first column 1 which is already stored in said arithmetic operation circuit 40. One digit time after the program register 37-2 is stored with the code 2 corresponding to the second column 2, a program positioning code C is shifted to said program register 37-2 as shown in FIG. 6. The arrival of said program positioning code C is sensed by a detection circuit 37-19 for detecting a program positioning code and empty code. After delayed one digit time in a delay circuit 20, said program positioning code signal is conducted as a reset input to the flip-flop circuit 37-6 through an OR circuit 37-21, thereby stopping shifting in the program registers 37-1, 37-2 which continued up to this point by an output from the Q terminal of the flip-flop circuit 37-6. At this time, the program register 37-2 is stored with a code "5" corresponding to the fifth column 5 in succession to the program positioning code C. The flip-flop circuit 37-6 which is now reset gives forth an output from the Q̄ terminal, which is transmitted to a one-shot circuit 37-23 through a timer 37-22. This timer 37-22 is set at a fully longer time than that required to carry out an arithmetic operation according to the prescribed program in the arithmetic operation circuit 40. Upon completion of the arithmetic operation, the timer 37-22 sends forth an output to the one-shot circuit 37-23. This one-shot circuit 37-23 consists of a delay circuit 37-25 supplied with an output from said timer 37-22, AND circuit 37-24, one of the gates of which is supplied with said output and an inverter 37-27 interposed for electrical connection between the other gate of said AND circuit 37-24 and delay circuit 25. An output issued from the timer 37-22 upon completion of an arithmetic operation is supplied in the form of an output from the AND circuit 37-24 to the impression control device 32 through the OR circuit 33 (FIG. 1A). The results of an arithmetic operation performed in the arithmetic operation circuit 40 is stored in the input buffer register 26 through the OR circuit 25, before the aforesaid time at which the timer 37-22 was previously set is passed. An output from the one-shot circuit 37-23 is delivered as a printing instruction to the impression control device 32 through the OR circuit 33. As described in connection with FIG. 3, when the inpression control device 32 generates outputs 1, 2, the results of an arithmetic operation are supplied to the printing device 22 which supplies the printing instruction signal, through the input buffer register 26, AND circuit 27, input buffer register 28, AND circuit 29 and printing output control device 36 in turn, so as to be impressed in the prescribed column, for example, the fifth column 5. Upon completion of said impression in said fifth column 5, the impression control device 32 generates the output 3 which causes the binary counter 37-3 to count up to 5. Since at this time, the program register 37-2 is still in a state stored with the code 5 corresponding to the fifth column 5 according to the arithmetic operation program, coincidence between said count of 5 and the code number 5 denoting a fifth address corresponding to the fifth column 5 is detected by the coincidence circuit 37-4, a detection output from which sets the flip-flop circuit 37-6 through the OR circuit 37-5. An output from the Q terminal of the flip-flop circuit 37-6 is supplied as a shift instruction to the program registers 37-1, 37-2 for resumption of shifting therein. The latter program register 37-2 successively gives forth the prescribed code signals according to the arithmetic operation program, followed by printing of the results of arithmetic operation. When the entire arithmetic operation program is brought to an end, an empty code is shifted to the program register 37-2. An output therefrom denoting the empty code is detected by the program positioning code and empty code-detecting circuit 37-19. The resultant detection output resets the flip-flop circuit 37-6 through the inverter 37-26 and OR circuit 37-21 and also sets said flip-flop circuit 37-6 through the OR circuit 37-5, causing an output to be sent forth from the Q terminal thereof. As the result, shifting takes place again in the program registers 37-1, 37-2 to bring the stored condition thereof to the original form shown in FIg. 6. At this time, the binary counter 37-3 is reset by an empty code detecting signal to have the initial condition of counting again set at 1. The empty code detecting signal indicates the completion of entry of program data in the prescribed line of impression provided in a bill and is transmitted as a program completion signal or CR signal to the printing device 22 through the OR circuit 21 so as to return the printing head to the extreme left end of the printing device 22.

Where an arithmetic operation is required to totalize numerical values one line after another belonging to the respective columns of a bill by adding up said values, then the program completion signal is supplied as a signal instructing a vertical arithmetic operation to an adder 41 shown in FIG. 1B (for example, the type set forth in "Boolean Algebra with Computer Applications" by Gerald E. Williams, Chapter 8, p.183 to 210, 1970, published by McGraw-Hill Book Company). Outputs from the AND circuits 37-14 to 37-18 included in the decoder 37-10 are conducted to the address designation circuit 38 as instructions for designating readout addresses.

Figure 7:
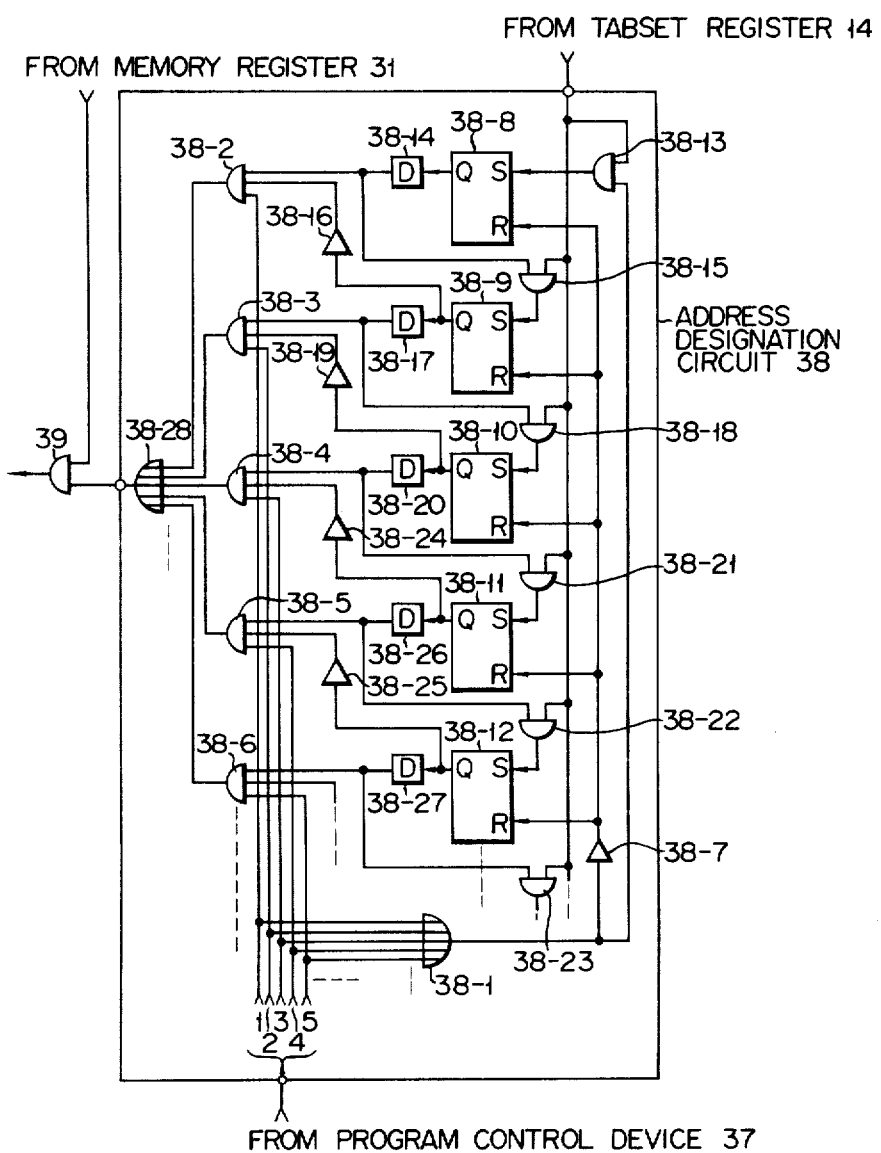
FIG. 7 is a concrete arrangement of an address designating circuit included in FIG, 1B.

There will now be described by reference to FIg. 7 the details of the address designation circuit 38. For convenience of description, the embodiment of FIG. 7 causes addresses first to fifth to be designated by the corresponding instructions. Obviously, the number of addresses can be controlled as required by increasing or decreasing the number of constituent elements. Code signals corresponding to the addresses first to fifth which are issued from the program control device 37 are supplied to one of the gates of an AND circuit 38-13 through an OR circuit 38-1. The other gate of the AND circuit 38-13 is supplied with a tabset designating signal from the tabset register 14. When supplied with an address designating code signal and a tabset signal for specifying the address, then the AND circuit 38-13 is opened, and an output issued at this time from said AND circuit 38-13 sets the flip-flop circuit 38-8. An inverter 38-7 is connected between the reset terminal of the flip-flop circuit 38-8 and the output terminal of the OR circuit 38-1. When the OR circuit 38-1 ceases to produce an output, the inverter 38-7 sends forth an output to the reset terminal of the flip-flop circuit 38-8. When, therefore, supplied with an address designating code signal from the program control device 37 through the OR circuit 38-1, the flip-flop circuit 38-8 continues to give forth an output. When supplied with code signal designating a first address and a first tabset signal from the tabset register 14, the AND circuit 38-13 generates an output to set the flip-flop circuit 38-8. An output from the Q terminal thereof is conducted to one of the gates of the AND circuit 38-2. Since the Q terminal output is delayed one bit time in the delay circuit 38-14, an AND circuit 38-15 is not opened even when supplied with a first tabset signal from the tabset register 14, and consequently a flip-flop circuit 38-9 is not set. Since the flip-flop circuit 38-9 does not produce an output, an inverter 38-16 gives forth an output, which is supplied to another gate of the AND circuit 38-2. The remaining gate thereof is supplied with an instruction designating a first address. The AND circuit 38-2 generates an outpt for a length of time corresponding to the width of the first column represented by the first address. Said output is delivered to one of the gates of an AND circuit 39 through an OR circuit 38-28 when the other gate of the AND circuit 39 is supplied with the information written in the first address and also already stored in the first memory register 31 of FIG. 1B, then said AND gate 39 generates an output, which is forwarded to the arithmetic operation circuit 40. When the gates of the AND circuit 38-15 are supplied with a second tabset signal from the tabset register 14 and also a one-bit delayed output from the delay circuit 38-14, then the AND circuit 38-15 produces an output, which sets the flip-flop circuit 38-9. An output from the flip-flop circuit 38-9 is conducted to one of the gates of the AND circuit 38-3 after being delayed one bit time in a delay circuit 38-17 and also to the inverter 38-16, thereby preventing the AND circuit 38-2 from producing an output. The AND circuit 38-3, one of the gates of which is already supplied with a delayed output from the flip-flop circuit 38-9, issues an output when an instruction designating the second address and an output from an inverter 38-19 are also delivered to the AND circuit 38-3. An output from this AND circuit 38-3 is transmitted to one of the gates of the AND circuit 39 through an OR circuit 38-28. When one of the gates of the AND circuit 38-18 is supplied with a second tabset signal, no output of the AND circuit 38-18 is produced at this time as an output from the flip-flop circuit 38-9 is delayed in the delay circuit 38-17, and the inverter 38-19 is not supplied with any signal, but conversely one of the gates of the AND circuit 38-3 is supplied with an input. The AND gate 39 produces an output when the aforesaid other gate thereof is supplied with the information written in the second address and already stored in the first memory register 31. Said output from the AND gate 39 is sent to the arithmetic operation circuit 40. Upon receipt of a function instruction from the program control device 37, the arithmetic operation circuit 40 carries out multiplication of a numerical value written in the first address corresponding to the first column and a numerical value entered in the second address corresponding to the second column. A product of said multiplication is stored in the first memory register 31 through the OR circuit 25, input buffer register 26, AND circuit 27, input buffer register 28, AND circuit 29 and OR circuit 30 in turn. The AND circuit 38-18 produces an output when one of its gates is supplied with a third tabset signal from the tabset register 14 and the other gate thereof is supplied with an output from the delay circuit 38-17. An output from the AND circuit 38-18 sets the flip-flop circuit 38-10 and is also supplied to one of the gates of the AND circuit 38-4 through a delay circuit 38-20. Said AND circuit 38-4 gives forth an output when its two other gates are respectively supplied with an output from an inverter 38-24 and a code signal designating the third address which is delivered from the program control device 37. An output from the AND circuit 38-4 is conducted to the aforesaid other gate of the AND circuit 39 through an OR circuit 38-28. The result of an arithmetic operation stored in the first memory register 31 is supplied to said other gate of the AND circuit 39. An output from this AND circuit 39 is delivered to the arithmetic operation circuit 40 so as to be entered in the third column of a bill. In the same manner as described above, the AND circuit 38-21 is opened upon receipt of a fourth tabset signal from the tabset register 14, the AND circuit 38-22 is opened upon receipt of a fifth tabset signal from said tabset register 14, and the AND circuit 38-23 is opened upon receipt of sixth tabset signal from said tabset register 14. The inverters 38-24, 38-25 of FIG. 7 cease to produce an output, when the corresponding flip-flop circuits 38-11, 38-12 are set. The delay circuits 38-26, 38-27 give forth an output one bit time after the flip-flop circuits 38-11, 38-12 produce an output. Outputs from the delay circuits 38-26, 38-27 are delivered to the corresponding AND circuits 38-22, 38-23. According to the above-mentioned circuit arrangement, the AND circuit 38-2 continues to generate an output for a length of time corresponding to the width of the first column defined between the first are second tabset positions included in those stored in the tabset register14. The AND circuit 38-3 continues to issue an output for a length of time corresponding to the width of the second column defined between the second and third tabset positions. The AND circuit 38-4 continues to produce an output for a length of time corresponding to the width of the third column defined between the third and forth tabset positions. The AND circuit 38-5 continues to give forth an output for a length of time corresponding to the width of the fourth column defined between the fourth and fifth tabset positions. The AND circuit 38-6 continues to send forth an output for a length of time corresponding to the width of the fifth column defined between the fifth and sixth tabset positions. Thus any of the AND circuits 38-2 to 38-6 produces an output corresponding to the address designated by a readout address designating instruction delivered from the program control device 37. Said output is transmitted to one of the gates of the AND circuit 39, the other gate of which is supplied with the information on the designated address which is stored in the first memory register 31. An output from the AND circuit 39 is supplied as a signal denoting a numerical value written in the designated address to the arithmetic operation circuit 40.

Upon completion of impression of numerical values indicated in one line of a bill, the program control device 37 generates a program completion signal, which in turn is supplied to the adder 41. As the result, information on numerical values shown in the first line of a bill which is stored in the first memory register 31 is shifted to a second memory register 42 through the adder 41. Similarly, when information on numerical values entered in the second line is stored to the first memory register 31 and a program completion signal is supplied to the adder 41, then said adder 41 carries out addition or subtraction, as the case may be, between information on numerical values written in the second line of a bill which is stored in the first memory register 31 and information on numerical values indicated in the first line of a bill which is stored in the second memory register 42. The result of said arithmetic operation, that is, a vertical total is stored in the corresponding address of the second memory register 42. Said stored vertical total arrived at by adding up numerical values belonging to the respective columns one line after another is drawn out of the second memory register 42 in synchronization with shifting in the tabset register 14, each time a tabset signal is issued therefrom. An output of said verticl total from the second memory register 42 is conducted to the first input buffer register 26 throughout the OR circuit 25. The vertical total stored in said first input buffer register 26 is delivered to the printing device 22 for impression through the same route as that through which the previously mentioned information on numerical values is delivered to said printing device 22, namely, through the AND circuit 27, second input buffer register 28, AND circuit 29 and printing output control device 26 in turn.

There will now be described by reference to FIGS. 8 to 11A, 11B, 11C the manner in which numerical values are concretely entered in the corresponding columns appearing on a bill by means of the logic circuits shown in FIGS. 1A, 1B to 7.

Now let it be assumed that articles designated as AS-8E, 202A and R-1 under the caption of "ITEM" in a bill have unit costs indicated in FIG. 8. Where, in this case, the number and amount of each article sold by each of the stores A, B, C, article total amount, that is, a total amount of said each article summed up through the stores A, B, C, and total number and total amount of said different types of articles sold by each of the stores A, B, C which are vertically arranged in the bill are to be entered in the corresponding columns of the bill having the widths shown in FIG. 8, then tabsetting is carried out in the tabset register 14 of FIG. 1A to determine the prescribed widths of eight columns in which numerical values are to be recorded. In the bill of FIG. 8, tabset positions are provided at nine points, namely, the 15th 30th, 40th, 55th, 65th, 80th, 90th, 105th and 120th digit positions, thereby forming eight columns from the first to the 8th, extending the column captioned as ITEm in which the aforesaid different types of articles are to be indicated. Tabsetting in the tabset register 14 is effected first by producing a space signal by operation of the keyboard 11, confirming the advance of the printing head of the printing device 22, and storing the progressively changing position of said printing head, with rightward shifting carried out in the impression position register 15. Thereafter, when a bit signal arrives at the 15th digit position, namely, the first tabset position [15], the keyboard 11 is operated to give forth a tabset signal, thereby opening the AND circuit 12. Said tabset signal is written at the [15] tabset position of the tabset register 14 in which shifting takes place through the OR circuit 13 in synchronization with that carried out in the impression position register 15, thus causing the first tabset position of a bill to be stored in said tabset register 14. Where space signals and tabset signals are alternately generated by operation of the keyboard 11, then the respective tabset positions of FIG. 9A are provided to define the prescribed widths of the columns appearing on a bill.

Next, a prescribed arithmetic operation program is stored in the program register 37-1 similarly by operation of the keyboard 11 through the OR circuit 37-28. To enter the unit cost of the article AS-8E in the first column, the keyboard 11 is again operated to give forth a CR instruction so as to return the printing head previously set in place after defining all the aforesaid tabset positions from [15] to [120] to the extreme left end of the printing device 22. Upon completion of the clear return of the printing head, the printing device 22 produces a CR completion signal, which sets the flip-flop circuit 23. At this time, an impression advancing instruction is supplied to the printing device 22 to forward the printing head to the right, and also to instruct the commencement of rightward shifting in the impression position register 15. When the rightward shifting therein proceeds and a stored bit signal showing the advanced position of the printing head coincides with the first [15] tabset position of the tabset register 14 as shown in FIG. 9B, then the AND circuit 24 produces an output which resets the flip-flop circuit 23, thereby preventing the OR circuit 16 from generating an output. As the result, the printing head stops at the first [15] tabset position as illustrated in FIG. 8. Under this condition, the keyboard 11 is operated to enter a numerical value of 29,800 denoting the unit cost of the article AS-8E in the input buffer register 26 through the OR circuit 25, thereby impressing said numerical value of 29,800 in the first column of a bill through the previously described route. Thereafter, numerical values associated with said article which are given in the second to the eighth columns are impressed, and all numerical values indicated in the first line of the bill are stored in the first memory 31. Upon completion of impression of all the numerical data in the first line, the program control device 37 issues a program completion signal, which is supplied to the printing device 22 as a CR signal, to return the printing head to the extreme left end of the bill. Thereafter, the unit cost 72,000 of another article 202A shown in the second line which is to be entered in the first column is impressed. Repetition of the aforesaid operation completes the entry of said unit cost 72,000 in the second line.

Where recording of numerical values in the lines of the respective columns is brought to end and a this time it is further desired to obtain the vertical totals of numerical values belonging to the respective columns by adding up said values one line after another, then this object is attained by the following process. Namely, when numerical values associated with the article AS-8E are fully entered in the first to the eighth columns as shown in FIG. 11A, all the entered information is stored in the first memory register 31. At this time, the program control device 37 sends forth a program completion signal, which is supplied to the adder 41 as an instruction for a vertical arithmetic operation. As the result, the information stored in the first memory register 31 is shifted to the second memory register 42. Since, at this time, the second memory register 42 is not stored with any information, the numerical values given in the frirst line are stored therein just as shifted as illustrated in FIG. 11B. Thereafter, when impression of all the numerical values associated with the article 202-A which are indicated in the second line is finished, then the entire impressed information is first stored in the first memory register 31. Upon receipt of a program completion signal, the adder 41 adds together the numerical values associated with the article AS-8E and those of the article 202-A shown in the respective columns, and the sums thus obtained are stored in the addresses of the second memory register 42 corresponding to said columns. Thus the numerical values associated with the different types of articles designated as AS-8E, 202-A, R-1 are vertically summed up one line after another and the results of all these vertical addition operations are stored in the corresponding addresses of the second memory register 42. The vertical total 258,800 of the first column and the vertical totals of the second to the eighth columns, that is, 26; 1,494,000; 45; 2,865,000; 68; 4,694,000; and 9,053,000 are read out from the addresses of said second memory register 42 corresponding to the columns in which all these totals are recorded, in synchronization with a tabset signal being supplied from the tabset register 14. The above-mentioned vertical totals of the eight columns are delivered to the input buffer register 26 through the OR circuit 25, though the process of said delivery is not shown. The printing device 22 impresses all said vertical totals in the corresponding columns as shown in FIG. 11C by the same process as used in reading out said vertical totals.

What is claimed is:

1. An apparatus for arithmetically processing bill records which comprises means for supplying numerical data; arithmetic operation means coupled to said means for supplying for arithmetically processing numerical data delivered from the means for supplying numerical data in accordance with the required type of arithmetic operation of numerical data being entered in a plurality of columns conforming to a given form of a bill; tabset signal input means for producing a plurality of tabset signals denoting boundaries between every adjacent column so as to determine a number of digits being impressed in respective columns conforming to said given form of a bill prior to supply of said numerical data; a tabset position memory register coupled to said tabset signal input means for storing a tabset signal issued from the tabset signal input means; a column signal generator coupled to said tabset position memory for giving forth a signal denoting the width of each column upon receipt of a tabset signal from said tabset position memory; first memory means coupled to said arithmetic operation means and to said column signal generator and having the same digit storing capacity as said tabset position memory and having its digit storing capacity divided in accordance with column width signals sent forth from the column signal generator for entering numerical data being recorded in the respective columns of a bill and results of arithmetic operation delivered from said arithmetic operation means in series in corresponding addresses of the first memory means; and printing means coupled to said first memory means for impressing numerical data stored in the first memory means in the corresponding columns of the bill.

2. An apparatus according to claim 1, further comprising an adder and second memory means coupled to said first memory via said adder, said second memory means having the same digit storing capacity as the first memory means and having its digit storing capacity divided into sections corresponding to widths of the respective columns of the bill in conformity to the first memory means for storing results of arithmetically processing numerical data belonging to respective columns one line after another.

3. An apparatus for arithmetically processing bill records which comprises arithmetic operation means for processing numerical data; printing means so as to print one character of data after another on a line of a bill; an impression position register in which shifting takes place in synchronization with the movement of the printing means which is coupled thereto so as to store the progressively advancing position of the printing means; input means coupled to said printing means for supplying an instructing signal to said printing means for its advance and coupled to said impression position register also for supplying the impression position register with an instruction for the commencement of shifting therein and other numerical data and instructions; a tabset register coupled to said input means and responsive to a tabset signal therefrom and having the same digit storing capacity as said impression position register, in which shifting is carried out in synchronization with that taking place in the impression position register and is related to the advance of the printing means by storing a signal corresponding to the advance position of the printing means which has been stored in the impression position register upon receipt of a tabset signal from the input means so as to define tabset positions of the bill thus dividing one line of impression appearing thereon into sections corresponding to the desired column widths; an input buffer memory coupled to said input means for storing numerical data being impressed in columns of the bill as data supplied from the input means and coupled to said arithmetic operating means for storing the result of arithmetic operation from the arithmetic operation means; a logic circuit coupled to said buffer memory and to said tabset register for reading out numerical data stored in the buffer memory as numerical data being impressed in respective columns of the bill in synchronization with a tabset position signal delivered from the tabset register; first memory means coupled to said logic circuit and having a capacity to store upon receipt of an output from the logic circuit a largest possible number of digits representing the maximum printing capacity of the printing device in said first memory means which correspond to the widths of respective columns defined by the tabset positions stored in said tabset register; printing output control means coupled to said printing means and including an output buffer register which is coupled to said input buffer memory and to said logic circuit for temporarily storing the numerical data corresponding to respective columns of the bill from said input buffer memory in response to the output of the logic circuit which is controlled by an output issued from said tabset register each time tabset position defines the widths of columns defined by the tabset positions stored in said tabset register and supplies an output of data obtained by each character and a signal instructing the impression of said each character to the printing device and also supplies said impression position register with a signal instructing the shifting of each character in synchronization with the generation of a printing instruction; and program control means including additional memory means for storing programs designed for the arithmetic operation of numerical data given in the respective columns of the bill, counter means for progressively advancing counting in response to an instruction signal when impression of numerical data in each column is completed, and a readout instruction generator coupled to said counter and to said additional memory means and which, when coincidence is established between a count made by the counter and a number denoting sequential position of any of the columns indicated in a program stored in said additional memory means, generates a readout address designation instruction signal via an address designation circuit to designate an address of numerical data given in the column to be read out from said first memory means, said arithmetic operation means being coupled to said program control means and to said first memory means for arithmetically processing numerical data read out from the first memory means upon receipt of a function instruction signal from the readout instruction generator of the program control means for causing results of arithmetic operation to be stored in the buffer memory.

4. An apparatus according to claim 3, further comprising second memory means which has the same digit storing capacity as the first memory means and which is coupled thereto via an adder and in which shifting is carried out in synchronization with that taking place in the first memory means, to which a program completion signal being generated from the additional memory means of the program control means, when the additional memory means detects no memory data successively being shifted, is supplied as an instruction for either addition or subtraction and in which numerical data and the results arrived at by successively subjecting the numerical data to addition or subtraction belonging to the respective columns are stored one line after another.

5. An apparatus according to claim 3, wherein the tabset register and first memory means have the same digit-storing capacity, and shifting in both elements is carried out simultaneously.

6. An apparatus according to claim 4, wherein the first and second memory means have the same digit-storing capacity, and shifting in both memories is carried out simultaneously.

7. An apparatus to claim 3, wherein the logic circuit is provided with gate means for determining the timing in which a tabset position signal from the tabset register for defining the width of each column appearing on the bill is supplied to said logic circuit.

* * * * *

UNITED STATES PATENT AND TRADEMARK OFFICE
CERTIFICATE OF CORRECTION

PATENT NO. : 4,045,780
DATED : August 30, 1977
INVENTOR(S) : Toshio Kashio

It is certified that error appears in the above-identified patent and that said Letters Patent are hereby corrected as shown below:

Add the following:

[30] Foreign Application Priority Data
June 22, 1972　　Japan..... 62674/72

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*